United States Patent [19]

Lavigne

[11] 4,319,166

[45] Mar. 9, 1982

[54] METHOD AND APPARATUS OF AUTOMATICALLY PROCESSING AND CORRECTING THE BLOCKING VOLTAGE OF AN ELECTRON GUN

[75] Inventor: Andre Lavigne, Montrouge, France
[73] Assignee: Videocolor, S.A., France
[21] Appl. No.: 167,166
[22] Filed: Jul. 9, 1980
[30] Foreign Application Priority Data
    Jul. 9, 1979 [FR] France .................. 79 17708
[51] Int. Cl.³ ........................... H01J 29/52
[52] U.S. Cl. ....................... 315/384; 358/219
[58] Field of Search ............ 315/384; 358/171, 219
[56] References Cited
    U.S. PATENT DOCUMENTS
    3,855,614 12/1974 Okada .................. 358/219

4,012,775 3/1977 Smith .................. 358/171

Primary Examiner—Theodore M. Blum
Attorney, Agent, or Firm—Pollock, Vande Sande & Priddy

[57] ABSTRACT

The blocking voltage of an electron gun is corrected by periodically removing an input video signal and driving a cathode with a DC stabilizing voltage. A pulse perturbation is impressed upon a control grid and the cathode momentarily conducts more heavily to exceed a predetermined threshold corresponding to the limit of a black CRT picture. A feedback loop detects a response signal from the perturbation of cathode current and stores the response signal in a memory, the latter determining the corrected blocking voltage during normal operation of the gun.

6 Claims, 3 Drawing Figures

METHOD AND APPARATUS OF AUTOMATICALLY PROCESSING AND CORRECTING THE BLOCKING VOLTAGE OF AN ELECTRON GUN

FIELD OF THE INVENTION

The invention relates to a method for correcting the blocking voltage of an electron gun or guns of a cathode-ray tube and to a corresponding apparatus. The invention finds its most useful application in the automatic correction of the blocking voltage of the three electron guns of a color television tube.

BACKGROUND OF THE INVENTION

In an electron gun of a television tube, it is known that the intensity of the electron beam which is generated by the gun depends upon the potentials applied to the electrodes of this gun. The video modulation signal with which it is intended to vary the intensity of the beam is applied to one of the two electrodes of the gun. It should be noted that the invention relates in particular to systems in which the modulation signal is applied to the cathode. The signal applied to this electrode is provided by an amplifier and it comprises a continuous component of constant value, upon which the video modulation signal per se is superimposed. The continuous component, correctly regulated, is also called the blocking voltage, because it is this voltage which enables the production of a black image at the limit of the gray (that is to say, a cathode current whose intensity is effectively zero) whenever the video modulation signal is zero. In other words, this continuous component, which is developed by the amplifier, must be equal to the suppression voltage of the electron gun, which is precisely that voltage which is required for the image to be black but at the limit of the gray scale.

Now, it is known that the suppression voltage of the electron gun, a value which is characteristic for the gun, may gradually change over the service life of the cathode-ray tube. Furthermore, the generator means for the blocking voltage in the amplifier may exhibit drifting tendencies, and the image may become too bright or too dark. In a color television receiver, this phenomenon has serious consequences, because the slow drifting can affect the three electron guns in different proportions, which translates as an imbalance in the dosage of the three primary colors.

An automatic correction system for the blocking voltage of an electron gun has already been proposed, specifically in a prior patent application by the present applicant, permitting a periodic reevaluation of the continuous component provided by the amplifier, no matter what may be the causes of the drifting. In brief, this system comprises a feedback loop of the amplifier acting thereupon in order to correct the continuous polarization of one of its amplification stages and whose input magnitude was not different from the cathode current itself, measured during successive measurement periods during which it was supposed to be theoretically zero. The measurement or scanning period was selected at the end of the frame return in order to be able to maintain a zero modulation signal at the input of the amplifier. Because the feedback loop could not be permanently linked to the connection established between the output of the amplifier and the cathode, a commutator means was provided in order to activate this loop solely during the successive measurement periods, a memory being meanwhile connected to the control input of the amplifier in order to maintain the assigned value (defining the polarization of the appropriate stage of the amplifier) between two successive measurement periods.

This system functions satisfactorily so long as certain leakage currents in the gun are weak. However, certain cathode-ray tubes, by virtue of their structure, exhibit a permanent leakage current, particularly between the cathode and the filament, which is likely to distort the functioning of the feedback loop in stabilizing the continuous component of the amplifier to a value different from that of the blocking voltage required. Examples of the prior art include U.S. Pat. No. 3,855,614 and German DOS No. 2,702,817. The invention proposes, among other features, a new conception of the feedback loop permitting this supplementary problem to be taken into account. More precisely, the invention retains the principle of the regulation of the continuous polarization of the amplifier by means of a feedback loop including a memory as defined above, but it modifies both the structure of this feedback loop and its mode of sequential operation resulting in the periodic updating of the status of the memory.

OBJECT AND SUMMARY OF THE INVENTION

In this spirit, the invention can thus be defined as a method for correcting the blocking voltage of an electron gun, normally modulated by its cathode, by way of an amplifier connected to this cathode in order to transmit to it a modulation signal and a continuous component, of a type such that there is a periodic readjustment of this continuous component by means of feedback, a memory of said feedback permanently connected to polarization means of said amplifier being periodically charged to an updated assigned value, the novelty comprising:
- temporarily stabilizing the point at which the amplifier begins to function in the vicinity of the blocking voltage;
- producing a perturbation of the cathode current of the electron gun in such a manner that the gun emits, abruptly exceeding the black threshold;
- and picking up a transitory signal in the amplifier corresponding to said perturbation and utilizing this transitory signal, without the continuous component, to charge the memory.

The invention also relates to an apparatus for correcting the blocking voltage of an electron gun normally modulated by its cathode, a modulation signal amplifier having its output connected to this cathode, of the type including a feedback loop connected to a control input for the continuous polarization of the amplifier and including a memory whose output is connected to said control input in order to permanently impose as assigned electric magnitude on said control input, the input of said memory being connected to a branching interruptor means for invalidating this input outside of successive measurement periods, the novelty comprising:
- a stabilization signal generator, one output of which is connected to the input of said amplifier;
- a conductivity perturbation signal generator of said gun connected to said cathode-ray tube, the two generators being controlled and synchronized so that the perturbation signal is of shorter duration than the stabilization signal and that it appears abruptly after the appearance of the stabilization signal; and a capacitative connection established between said feedback loop and a selected element of said amplifier, which is sensitive to a perturbation caused by said perturbation signal generator.

For the sake of better comprehension of the double definition of the invention given above, the following theoretical development will be considered.

In a first approximation, the cathode current Ik obeys the following law of variations:

$$Ik = K\ Vv^{2.7}$$

where K is a constant and Vv is the modulation voltage, which allows two components:

$$Vv = Vco - Vi$$

with Vco being the blocking voltage referred to above and Vi being the instantaneous voltage resulting from the modification. It can thus be seen that Ik disappears at the same time as Vv. The functioning of the earlier system was the subject of the earlier patent application by the present applicant, consisting in the development of the blocking voltage ascertained by measuring the cathode current at one instant and under conditions where it had to be theoretically zero and in applying the error signal to the control input of the amplifier by way of the above-mentioned feedback loop. Unfortunately, as noted above, it was possible for a leakage current to exist in the electron gun, especially between the cathode and the filament, of such a nature that the true law for cathode variation is in fact:

$$Ik = K\ Vv^{2.7} + Io$$

where Io represents the permanent leakage current.

The fundamental concept of the invention is based on the ascertainment that this new law of variation allows the same drifting as the earlier one (because Io is constant) and that this drifting also disappears at the same time as Vv and Ik. In consequence, the control according to the invention is based on the cancellation of this drift in order to eliminate the influence of the leakage current Io.

To put this fundamental concept into concrete form, a sequential process is then defined resulting in the periodic updating of the memory means by a capacitative connection eliminating any continuous component. This sequential process includes two essential phases:

a phase of preparation, permitting the stabilization of the instantaneous point at which the amplifier begins to function—that is to say, the cancellation of the video modulation component; and a phase of perturbation, coinciding with the measurement period during which the feedback loop is effectively active, in the course of which a perturbation of the voltage is applied to the cathode of the electron gun and a perturbation of the current corresponding thereto is accordingly picked up in a correctly selected element of the amplifier, this secondary perturbation being subsequently transmitted to the memory means by way of the capacitative connection already mentioned.

It is this which expresses the method discussed above and which defines the invention.

The voltage perturbation is conveniently applied to one of the grids of the electron gun, and in particular to the control grid labelled $G_1$.

Furthermore, the preparation phase more particularly comprises replacing the video signal applied to the input of the amplifier (during a predetermined interval of time which will be called the "stabilization period") with a constant voltage level corresponding to a blocked state of the electron gun. In return, this constant voltage level maintains the output voltage of the amplifier sufficiently close to the blocking voltage so that, under the influence of the perturbation applied to its grid, the gun abruptly exceeds the black threshold and functions in class C in response to this perturbation stimulus. During the period of stabilization, the video signal depends on the average brightness of the image which preceeds the frame return under consideration, during which the voltage level is introduced, and the "replacement" of this video signal can be effected simply by short-circuiting the input circuit of the video signal (at high impedance) through the input circuit of the constant voltage level (at low impedance), above the input of the amplifier.

The invention will be better understood and further objects, details, and advantages thereof will become more apparent from the ensuing detailed description of an automatic correction apparatus for the blocking voltage of an electron gun, taken in conjunction with the accompanying drawings, which are understood to be nonlimiting.

DESCRIPTION OF THE PREFERRED EMBODIMENT

Figure 1:
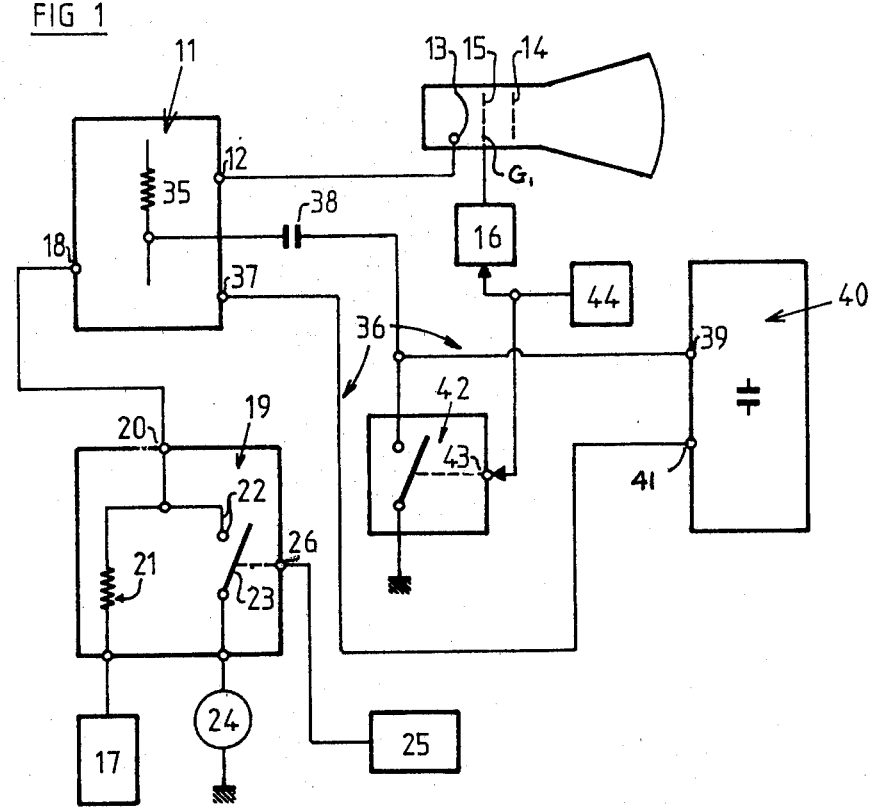
FIG. 1 is a block diagram of an apparatus according to the invention.
Figure 2:
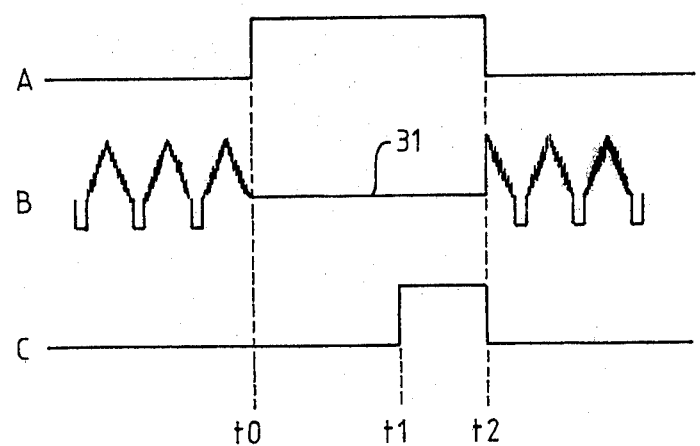
FIG. 2 is a diagram showing the course over time of the sequential process permitting the undating of the status of the memory means inserted into a feedback loop of the apparatus according to the invention.

As shown in particular in FIG. 1, a modulation signal amplifier 11 has its output 12 connected to the cathode 13 of an electron gun 14 of a color television tube. A grid 15 (preferably the grid labelled $G_1$) is connected to a perturbation signal generator 16. In addition, the brightness circuit 17 is connected to the input 18 of the amplifier 11 via a stabilization signal generator 19, the output 20 of this generator 19 being connected to the input 18. This stabilization signal generator 19 includes an input circuit of high impedance 21 (symbolized in FIG. 1 by a resistance), to which the modulation signal to be amplified is applied, delivered by the brightness circuit 17, and an input circuit of low impedance 22 includes a controlled interruptor means 23, to which a source of continuous voltage 24, of a predetermined value, is connected. The controlled interruptor means 23 can naturally comprise a simple transistor functioning in the saturated or blocked state. The high-impedance circuit 21 is connected to the low-impedance circuit 22 (and to the input 18) below the interruptor means 23—that is, at the ungrounded side of the voltage source 24. A pulse generator 25 is connected to one control input 26 of the interruptor means 23, in order to direct the closing of this interruptor means during the full length of one pulse delivered by generator 25. In fact, it may be said that the stabilization signal generator 19 represents a substitution means permitting the replacement of the modulation signal applied to the high-impedance input circuit 21 with the constant voltage of source 24 at input 18 of the amplifier 11 and during the entire period when the interruptor means 23 is closed. In effect, given the great difference in impedance between input circuits 21 and 22, the closing of the interruptor means 23 not only permits the constant voltage from source 24 to be applied to the input 18 of the amplifier, but also permits the short-circuiting of the video signal transmitted by the brightness circuit 17. This phenomenon is illustrated by the diagram of FIG. 2, where plot A represents a pulse delivered by generator 25 and plot B represents the shape of the signal observed during the same period of time (the stabilization period referred to above) at input 18 of amplifier 11. It can be seen that the video signal is suppressed during the entire length of pulse A (time interval $t_0$-$t_2$) and is replaced by a level voltage line 31. This voltage line 31, which is determined by the voltage source 24, is calibrated to a value such that the output voltage of the amplifier 11 stabilizes to a given value.

In addition, a component (in the example described, a resistor 35) in the amplifier 11 is selected, of which it is known that it is sensitive to a perturbation caused by the generator 16 and transmitted by the cathode 13 to the amplifier 11. This component represents the point of departure of a feedback loop 36 connected to one control input 37 of the amplifier 11. A voltage applied to this input 37 determines the continuous polarization of one stage of the amplifier 11 and accordingly the blocking voltage of the electron gun, if the amplifier is connected directly, which is the case in practice. The feedback loop is connected to the resistor 35 by a capacitor 38 which establishes the capacitative connection mentioned above with the input 39 of a memory 40. The output 41 of the memory 40 is connected directly to the control input 37. In addition, a controlled interruptor means 42 is connected between input 39 and ground. This interruptor means is normally closed in order to invalidate input 39 and in order to connect one of the terminals of the capacitor 38 to ground. When a control signal is applied at input 43 of this interruptor means, the connection to ground disappears, and the feedback loop is effectively active during a measurement period (or scanning period) mentioned above; that is, the feedback loop is active during the entire time that a signal remains applied to input 43. This signal is a pulse furnished by a pulse generator 44, which is also connected to the perturbation signal generator 16 in order to control it. Curve C of FIG. 2 shows the course of this control signal generated by generator 44. This control signal is a pulse which appears during the interval of time $t_1$-$t_2$ at the end of the stabilization signal. In other words, the system is controlled in feedback fashion so that the status of the amplifier 11 and the charge of the capacitor 38 are stabilized upon the appearance of the pulse from generator 44 which controls both the perturbation and the onset of the measurement period, during which the feedback loop 36 effectively becomes active. Naturally generators 25 and 44 may include common circuit portions, since they must be synchronized and controlled in interrelated fashion so that the perturbation signal is shorter in duration than the stabilization signal and so that it will appear abruptly after the appearance of the stabilization signal, preferably at about the end of the stabilization signal. The function of the apparatus is as follows:

During the time interval $t_0$-$t_1$, the control input 37 receives a signal of definitely assigned value during the preceding cycle (that is to say, at the time of the preceding frame return), and the input 18 receives a voltage level 31 which stabilizes the point at which the amplifier 11 begins to function (elimination of video fluctuations) and the charge of the capacitor 38. The stabilization of the charge of the capacitor 38 is attained at time $t_1$. At this instant, the interruptor means 42 opens. If all other elements remain the same, no signal will be transmitted to the memory 40. Meanwhile, a perturbation is then applied to grid 15 by the perturbation signal generator 16. This perturbation translates as a variation in the current at the output 12 of the amplifier 11, which oscillates in the resistor 35 and is transmitted by the capacitor 38 to the memory 40. The status of this memory 40 is thus "re-updated" in order to control the control input 37 and to maintain the continuous component furnished by the amplifier 11 at the value of the required blocking voltage.

Figure 3:
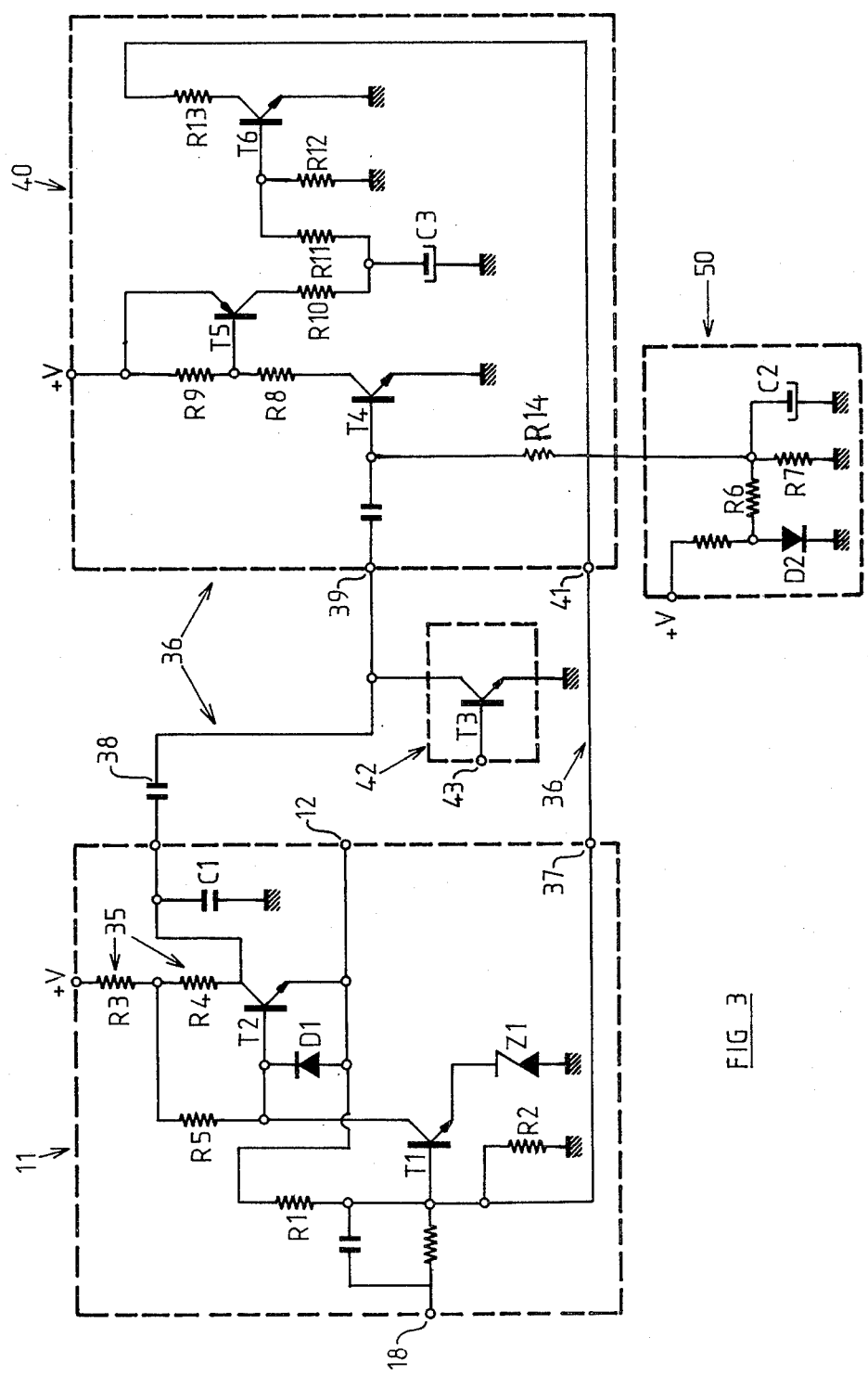
FIG. 3 is a detailed schematic representation of the apparatus shown in the block diagram of FIG. 1.

FIG. 3 shows one particular arrangement of the video amplifier associated with its feedback loop in capacitative connection, the stabilization signal generator and the perturbation signal generator being omitted. Those elements already described in connection with FIG. 1 are given identical reference numerals.

The amplifier 11 includes two transistors T1 and T2. The input 18 is connected to the base of the transistor T1 and the collector of transistor T1 is connected to the base of the transistor T2. The emitter voltage of transistor T1 is stabilized by a Zener diode Z1. The output 12 of the amplifier is connected to the emitter of transistor T2. One diode D1 is connected between its emitter and its base. A voltage feedback is obtained by a resistor bridge R1–R2, the resistor R1 being connected between output 12 and the base of transistor T1, while resistor R2 is connected between the base of transistor T1 and ground. This feedback assures both the resting value for the output voltage and a weak impedance at the output. Resistor 35, mentioned above, is connected between the collector of transistor T2 and a source of supply voltage +V. This resistor 35 is actually made up of two resistors R3 and R4 switched in series, the center point being connected to the base of the transistor T2 by means of a resistor R5. The resistor 35 (R3+R4) is the component which is sensitive to the perturbation which has been selected in this type of amplifier. In effect, when a variation in current is applied to the emitter of the transistor T2, the system reacts so as to maintain the output voltage, and the perturbation is directed over the resistor 35 by means of the transistor T2. The grouping comprising resistors R3, R4 and R5 forms a compensating circuit which tends to react to variations in the output voltage of the amplifier, resulting in the same action on the part of the feedback loop at the moment when it is in fact active. Actually, there is the risk of followup oscillations in the direction of and with the amplitude of these internal variations. It has been demonstrated that the compensation is optimal for $$R3=(R3+R4) R5/R1$$

Accordingly, the variations in the output voltage tranmitted to the memory by way of the capacitative connection remain essentially representative of the perturbation of the cathode current. The collector of transistor T2 is connected via the capacitor 38 to the feedback loop 36. A further capacitor C1 located between the collector of transistor T2 and ground plays the role of filtering high frequency. The interruptor means 42 comprises a transistor T3 whose collector is connected to the other terminal of capacitor 38 and whose emitter is connected to ground. The control input 43 mentioned above comprises the base of this transistor T3. The junction between the capacitor 38 and the collector of the transistor T3 is connected to the input 39 of the memory 40, which includes a threshold amplifier circuit (transistors T4 and T5). The base of transistor T4 is in fact polarized to the limit of its conductivity with the aid of the threshold circuit 50 comprising a diode D2, a resistance divider bridge R6–R7 and an uncoupling capacitor C2. The center point of the resistance bridge R6–R7 is connected to the base of transistor T4 by way of a resistor R14. It will be appreciated that the impedance of the input of the amplifier circuit comprising transistors T4 and T5 is increased in such a manner that the time constant which is formed by the capacitor 38, with this input impedance (naturally, that which exists during a period of measurement corresponding to the blocking of transistor T3), is increased, and in particular increased to a greater extent than the time constant defined by the same capacitor and resistor 35 (this time, that which exists outside of a measurement period, when the transistor T3 is saturated). The collector of the transistor T3 is connected to a resistance divider bridge R8–R9 whose center point is connected to the base of the transistor T5. This transistor is a PNP transistor, and its emitter is then connected to the supply voltage +V. The collector of transistor T5 is connected to a capacitor C3 (by way of a resistor R10) which represents the essential part of the memory element 40, since it is the status of the charge of this capacitor (whose other terminal is connected to ground) which conditions the assigned value at the control input 37. The junction between resistor R10 and capacitor C3 is carried to the base of a transistor T6 by way of a resistance divider bridge R11–R12. Outside the periods when the transistor T3 is blocked, the capacitor C3 thus polarizes the base of the transistor T6. The collector of this transistor is connected to the control input 37 by way of a resistor R13 of a type such that the state of conductivity of this transistor T6 funishes the assigned value applied to the control input 37.

It will be understood that the invention is not limited to the mode of embodiment described above but rather includes all possible equivalent techniques and means within the spirit and scope of the invention as defined by the following claims.

I claim:

1. A method for correcting a blocking voltage generated at the output of an amplifier connected to the cathode of a cathode-ray tube electron gun and minimizing the effect of leakage current between a tube filament and cathode, the method comprising the steps:
   periodically driving the amplifier with a selected input signal resulting in a DC stabilizing voltage at the output thereof;
   producing a perturbation of cathode current causing the gun to momentarily conduct beyond a predetermined level corresponding to the black picture threshold of the gun;
   sensing a response signal from the cathode current perturbation;
   capacitively coupling the sensed response signal to a memory which stores the response signal; and
   correcting the blocking voltage during the normal gun operation in accordance with the stored signal.

2. The method of claim 1 where the periodic driving step is achieved by terminating video input to the gun and in lieu thereof driving the amplifier with a selected DC input signal.

3. An apparatus for correcting a blocking voltage generated at the output of an amplifier connected to the cathode of a cathode ray tube electron gun and minimizing the effect of leakage current between a tube filament and cathode, the apparatus comprising:
   a stabilization signal generator having a first output thereof connected to an input of the amplifier for periodically operating the amplifier output to a DC level;
   a control grid;
   a pulse perturbation signal generator connected to the control grid for controlling cathode emission;
   means for synchronizing the stabilization and perturbation signal generators, the duration of each perturbation signal being less than that of each stabilization signal;
   means forming part of the amplifier for sensing a perturbation in cathode emission;
   capacitive coupling means connecting the sensing means to a memory means for storing a signal corresponding to the perturbation of cathode emission; and
   feedback means for connecting the memory means to a second input of the amplifier for correcting the blocking voltage of the gun to a preselected level, corresponding to the stored signal, during periods when the cathode experiences a video input modulating the blocking voltage.

4. The structure set forth in claim 3 wherein the stabilizing signal generator drives the amplifier in a manner excluding a video input to the amplifier.

5. The apparatus as set forth in claim 3 wherein the stabilizing signal generator includes an input circuit of high impedance to which a video modulation signal is applied, an input circuit of low impedance including a controlled switching means and to which a source of DC voltage of predetermined value is connected, the input circuit of low impedance effectively short circuiting the input circuit of high impedance during the occurrence of a stabilizing signal.

6. The subject matter set forth in claim 5 wherein the time constant of the capacitive coupling means taken in combination with an input impedance of the memory means is higher than the time constant of the capacitive coupling means taken in combination with the sensing means.

* * * * *